United States Patent
Brandt et al.

(10) Patent No.: US 9,175,989 B2
(45) Date of Patent: Nov. 3, 2015

(54) ACCIDENT SENSOR

(75) Inventors: Tobby Brandt, Boeblingen (DE);
Christian Ohl, Pfullingen (DE); Boris Adam, Gaeufelden (DE); Martin Schuerer, Aichtal (DE)

(73) Assignee: ROBERT BOSCH GMBH, Stuttgart (DE)

( * ) Notice: Subject to any disclaimer, the term of this patent is extended or adjusted under 35 U.S.C. 154(b) by 737 days.

(21) Appl. No.: 12/449,500

(22) PCT Filed: Jan. 9, 2008

(86) PCT No.: PCT/EP2008/050188
§ 371 (c)(1),
(2), (4) Date: Feb. 21, 2010

(87) PCT Pub. No.: WO2008/101746
PCT Pub. Date: Aug. 28, 2008

(65) Prior Publication Data
US 2010/0140419 A1    Jun. 10, 2010

(30) Foreign Application Priority Data

Feb. 23, 2007   (DE) .......................... 10 2007 008 862

(51) Int. Cl.
*G12B 9/00*   (2006.01)
*G01D 11/30*   (2006.01)
*B60R 21/01*   (2006.01)

(52) U.S. Cl.
CPC ....... *G01D 11/30* (2013.01); *B60R 2021/01006* (2013.01)

(58) Field of Classification Search
CPC ........... F16L 3/1233; F16L 3/233; F16L 3/12; F16L 3/137; F16L 3/2334
USPC ................. 248/27.1, 222.11, 222.12, 222.13, 248/222.14, 222.41, 222.51, 222.52, 248/292.14, 223.31
See application file for complete search history.

(56) References Cited

U.S. PATENT DOCUMENTS

| | | | | |
|---|---|---|---|---|
| 757,712 | A * | 4/1904 | Arnold | 403/238 |
| 4,515,439 | A * | 5/1985 | Esswein | 359/381 |
| 4,779,516 | A * | 10/1988 | Parker et al. | 92/128 |
| 5,056,412 | A * | 10/1991 | Gautier et al. | 91/368 |
| 5,644,093 | A * | 7/1997 | Wright et al. | 73/866.5 |
| 6,511,116 | B1 * | 1/2003 | De Jongh et al. | 296/97.9 |
| 8,444,100 | B2 * | 5/2013 | Takahashi et al. | 248/222.52 |
| 8,465,221 | B2 * | 6/2013 | Yan et al. | 403/348 |
| 2005/0251144 | A1 * | 11/2005 | Wilson et al. | 606/73 |
| 2013/0037660 | A1 * | 2/2013 | Tarantino et al. | 248/37.3 |
| 2013/0062488 | A1 * | 3/2013 | Chen | 248/222.14 |

FOREIGN PATENT DOCUMENTS

| | | |
|---|---|---|
| DE | 195 31 262 | 11/1996 |
| DE | 199 23 985 | 12/2000 |
| DE | 199 63 912 | 6/2001 |
| DE | 101 06 311 | 8/2002 |
| FR | 280 8 327 | 11/2001 |
| JP | 2004-518972 | 6/2004 |

* cited by examiner

*Primary Examiner* — Gwendolyn Baxter
(74) *Attorney, Agent, or Firm* — Kenyon & Kenyon LLP

(57) ABSTRACT

An accident sensor having a fastening arrangement for a vehicle is provided, for the fastening of the accident sensor, the fastening arrangement allowing an insertion into an opening in a wall and a rotation up to a final position defined by a stop, the fastening arrangement preventing a turning back of the accident sensor in the final position.

20 Claims, 5 Drawing Sheets

ACCIDENT SENSOR

FIELD OF THE INVENTION

The present invention relates to an accident sensor.

BACKGROUND INFORMATION

A sensor module in which the housing of an air-pressure sensor used for sensing side impact is attached to a wall in the vehicle with the aid of fastening arrangement, e.g., screws, is discussed in German patent document DE 199 23 985 A1. German patent document DE 101 06 311 A1 also indicates that an air-pressure sensor is installed in the door, on a partition wall between wet area and dry area in the door. In this instance, a pressure channel projects into the wet area while the air-pressure sensor is situated in the dry area. A sealing cushion is provided, which seals the housing interior from the pressure sensor and also the housing from the partition wall.

SUMMARY OF THE INVENTION

In contrast, the accident sensor according to the present invention having the features of the independent patent claim has the advantage that fastening arrangement is provided that allow for an insertion through an opening in the wall and then a rotation up to a specific stop that thus defines the final position. In the final position, the fastening arrangement is configured such that a turning back of the accident sensor is prevented and thus a fixed installation is made possible. This configuration makes it possible to avoid expensive screw connections. In the final position, the accident sensor is fastened as intended.

The fastening arrangement allows for a very simple and a simultaneously secure installation of the accident sensor. Additional installation safeguards may also be omitted. Such installation safeguards might be a torque monitoring, optical inspections of the rivets, and the like. In particular, a one-handed installation is possible, since the other hand does not have to use a tool.

As specified in the related art, the accident sensor is in particular an air-pressure sensor; however, it may also be an acceleration sensor, an environment sensor system, or a structure-borne noise sensor.

The fastening arrangement is defined according to the features described herein. They must allow for the insertion of the accident sensor through the opening in the wall and then the rotation, the stop, and the prevention of the turning back out of the final position. Examples for such a fastening arrangement include a modified bayonet lock, which prevents a turning back, for example.

A stop may be understood as a mechanical structure that prevents the accident sensor from being able to be rotated further.

The measures and further developments specified in the dependent claims allow for advantageous improvements of the accident sensor specified in the independent patent claim.

It is particularly advantageous that the fastening arrangement have a mechanical coding that allow for the insertion of the accident sensor in a single angular position. In this manner, the accident sensor is then already correctly oriented for the rotation. This mechanical coding may be achieved by a corresponding forming of the fastening arrangement. For this purpose, it is also possible to use supporting wings, for example, which also have the function of holding the pressure sensor in the installed state, that is, in the final position. In this context, in particular two supporting wings may be provided, and these two supporting wings are then formed differently, having different widths, for example. However, instead of supporting wings, it is also possible to use other structures.

In particular, the accident sensor has a sealing arrangement, for example, a sealing ring that then additionally seals the opening. This is advantageous in particular when the air-pressure sensor itself is located in the wet area and the opening leads into the dry area.

With regard to their hardness and/or form, the sealing arrangement may advantageously be configured to absorb the retention force, in order to then achieve an optimal force distribution on both sides of the wall in the vehicle door, together with the supporting wings. The hardness may be set by corresponding plasticizers, for example. In silicones that are used as the sealing ring material, different degrees of hardness may be set. This is characterized by the so-called shore index. With regard to the forming of the sealing arrangement, sealing rings may be implemented in a tapered manner or in a broad manner, in order to thus be able to absorb more or less force.

The fastening arrangement may have at least one mechanical rib that allows for the accident sensor to be rotated in only one direction after the insertion. Such a rib is formed in a semicircular manner, for example, and thus allows for a tab, which ultimately leads to the locking into place in the final position, to be rotated in only one direction, since the tab would otherwise abut against the rib. This tab may allow a locking into place in the final position, under the influence of a spring force whose restoring force secures the tab in the final position, for example. Thus, the accident sensor is then prevented from turning back out of this final position.

The accident sensor is advantageously formed such that the structures of the wall only allow for the cables to be connected to the accident sensor when the accident sensor has reached its final position. For example, this may be achieved by a notch in the wall, which is formed out of sheet metal, for example, so that the notch prevents the possibility of a connection of the cable in a position other than the final position.

It is advantageously possible for the accident sensor to have a marking that allows for a detection of the final position. It may be possible for an installer to detect this marking through a boring in the wall only in the final position, for example. This optical marking may be provided in the floor of the sensor, inside of the area sealed by the sealing arrangement, for example.

Typically, the notch may be impressed in the door's sheet metal, so that it mechanically prevents the connector plug from being plugged into the sensor as long as the sensor is not rotated into the final position.

Furthermore, it is possible to provide an additional fastening tab on the sensor, in case the secure installation in the vehicle is to be safeguarded by an additional screw or rivet, for example. The additional securing by a screw also allows for the electronic traceability of the correct installation in the vehicle, via a monitoring and recording of the torque, for example.

In summary, it is therefore possible for the accident sensor according to the exemplary embodiments and/or exemplary methods of the present invention to satisfy the following criteria according to its characteristics as described herein:
1. It may only be possible to insert the accident sensor into the opening of the wall in a single angular position.
2. The accident sensor may be rotated in only one direction after being inserted.
3. In the final position, a stop must prevent an over-rotation.

4. The accident sensor must lock into place audibly when it reaches the final position. The acoustic signal is thereby caused by a suitably designed clip.
5. The accident sensor may advantageously be designed such that it may not be detached, or may be detached only with damage, once it has reached the final position.
6. The accident sensor and the fastening arrangement should be designed such that the accident sensor is able to be contacted via cable or mating connectors only when it has reached its final position.
7. The accident sensor may have an additional securing tab that allows for an additional screw connection.

The accident sensor's tab, which locks into place in the final position, is designed as a clip tab. This clip then ensures that the accident sensor may not be rotated out of the final position anymore, or may be rotated out only when the clip is thereby destroyed.

Exemplary embodiments of the present invention are illustrated in the drawing and explained in greater detail in the following description.

DETAILED DESCRIPTION

Figure 1:
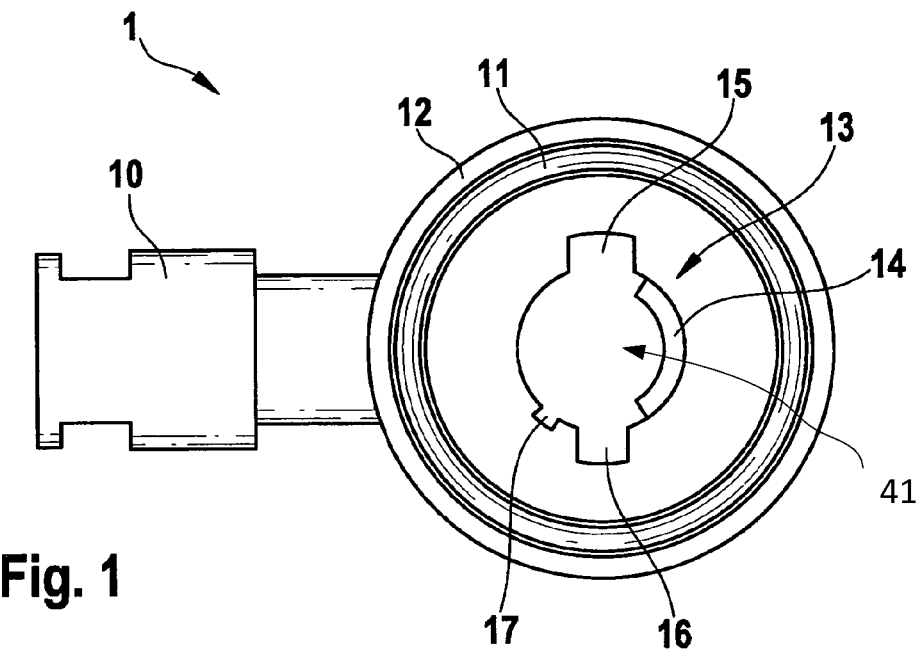
FIG. 1 shows a top view of the accident sensor according to the present invention.

FIG. 1 shows a top view of accident sensor 1 according to the exemplary embodiments and/or exemplary methods of the present invention, which in this instance is described as an air-pressure sensor for detecting side impact. Alternatively, other accident sensor types are possible, as specified above. Accident sensor 1 has a plug connector piece 10 and a main body 12 in which the pressure sensor element and connected electronics are located. In this instance, the side in the wet area is shown, which has the fastening arrangement. The fastening arrangement is provided inside of a sealing ring 11 made out of the sealing arrangement. In this instance, sealing ring 11 is provided as a ring. It is also possible to provide a rectangular sealing or other suitable forms. In this instance, the fastening arrangement have a disk 13 having supporting wings 15 and 16, supporting wing 15 being significantly wider than supporting wing 16. Furthermore, a mechanical rib 14 is shown, which prevents the accident sensor from being rotated in a wrong direction during installation. In addition, a tab 17 is indicated, which will lock into place in the final position, and thus prevents the accident sensor from turning back. Supporting wings 15 and 16 are formed differently in order to preset a mechanical coding so that air pressure sensor 1 may be inserted into the wall through the opening only in one specific angular position since the opening in the wall corresponds to this shape of the supporting wings. In this instance, the fastening arrangement is made out of plastic. Sealing ring 11 is formed out of silicon, as specified above. Other plastic materials are possible. Main body 12 of the air pressure sensor is metallic, it also being possible to use plastic materials in this instance.

Figure 2:
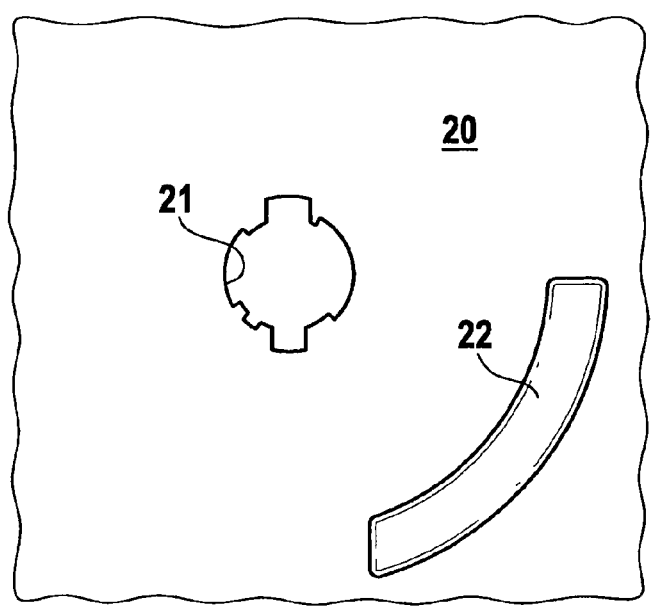
FIG. 2 shows a view of the wall having the opening and the notch.

FIG. 2 shows a view of wall 20 having an opening 21 and a notch 22, which is impressed into the wall made of sheet metal. With regard to its shape, opening 21 resembles the form of fastening arrangement 41, which includes 13 through 17, so that pressure sensor 1 having the fastening arrangement 41 may be passed through opening 21 only in one specific angular position. In the process, pressure sensor 1 is pressed against wall 20, through the pressing of sealing 11, for example. Impressed notch 22 prevents electric cables from being connected to plug connector 10 as long as pressure sensor 1 has not yet reached the final position.

Figure 3A:
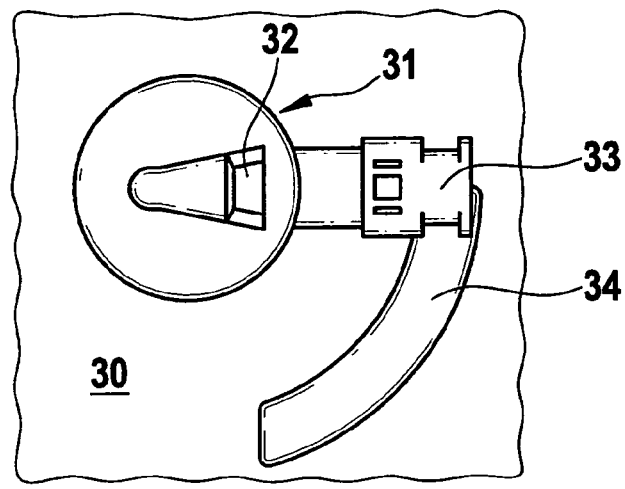
FIGS. 3a, 3b and 3c show the installation of the accident sensor.
Figure 3B:
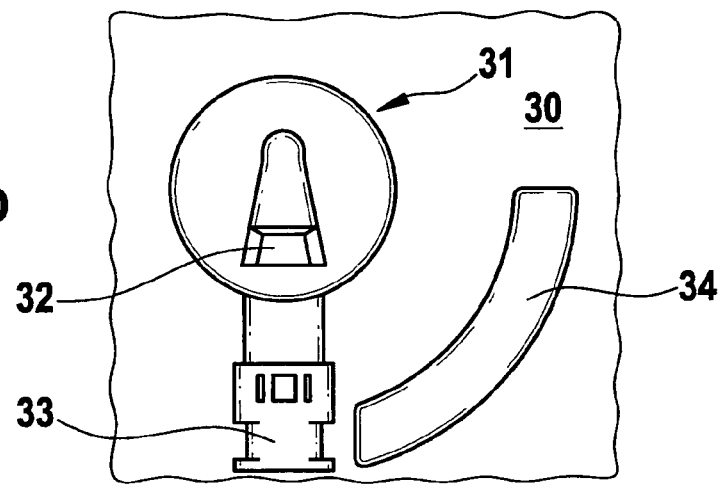
Figure 3C:
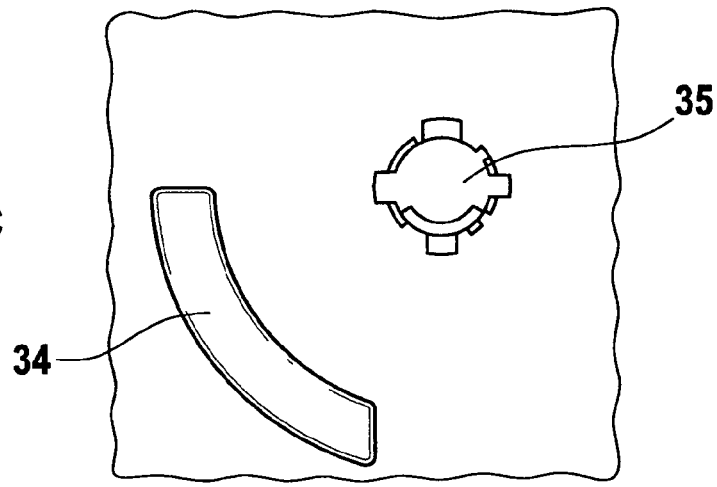

FIGS. 3a through c show the installation of the accident sensor according to the exemplary embodiments and/or exemplary methods of the present invention. FIG. 3a shows how the sensor is passed through the opening in wall 30. In this instance, the view from the side of the wet area in which the pressure sensor is located, for example, is shown. The pressure sensor has a plug connector part 33, a pressure-entry channel 32, and a body 31. In this instance, notch 34 is also shown, which prevents cables from being connected in this installation position.

In FIG. 3b, which shows the same elements using the same reference numerals, the sensor has now reached the final position and thus has also left notch 34 so that the cables may be connected. A rotation of 90 degrees has taken place.

FIG. 3c shows the view from the dry area and how fastening arrangement 35 fill in the opening.

FIGS. 4a through f show the different steps during installation of the accident sensor from the dry area side. In this instance as well, identical elements are labeled with the same reference numerals.

Figure 4A:
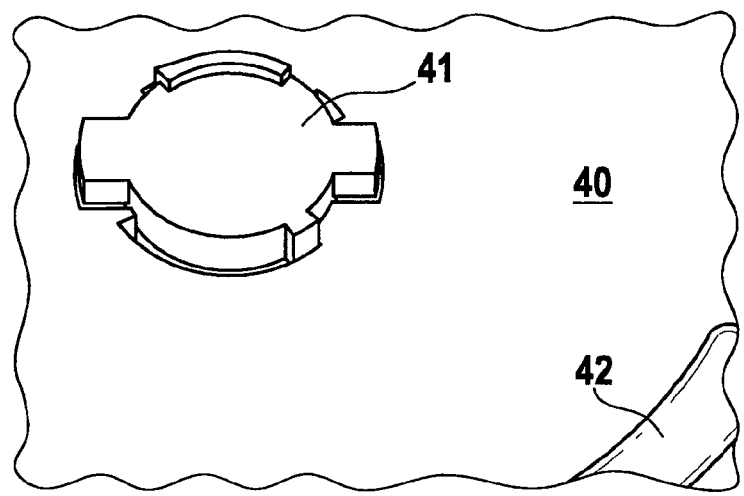
FIGS. 4a, 4b, 4c, 4d, 4e and 4f show the operations of installation of the accident sensor, as well.
Figure 4B:
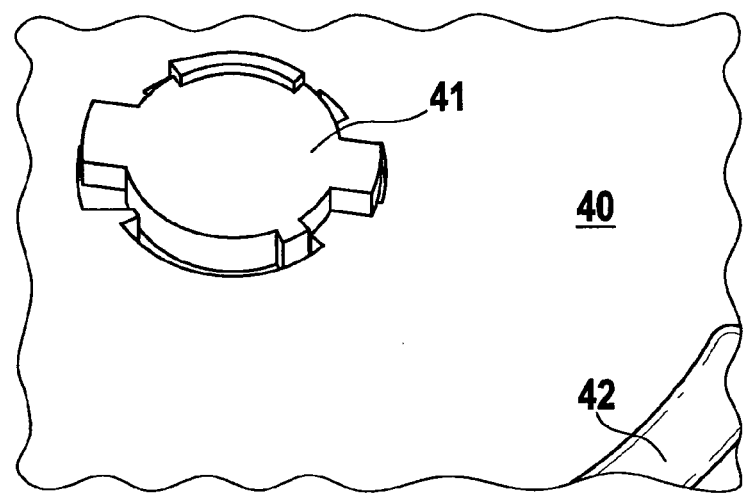
Figure 4C:
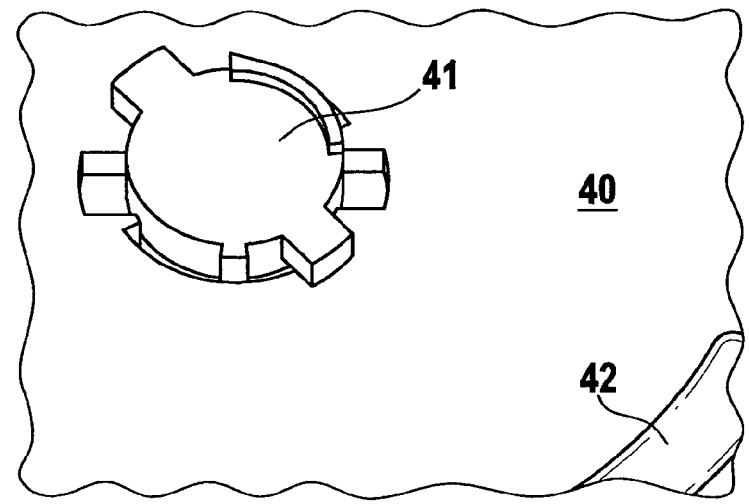
Figure 4D:
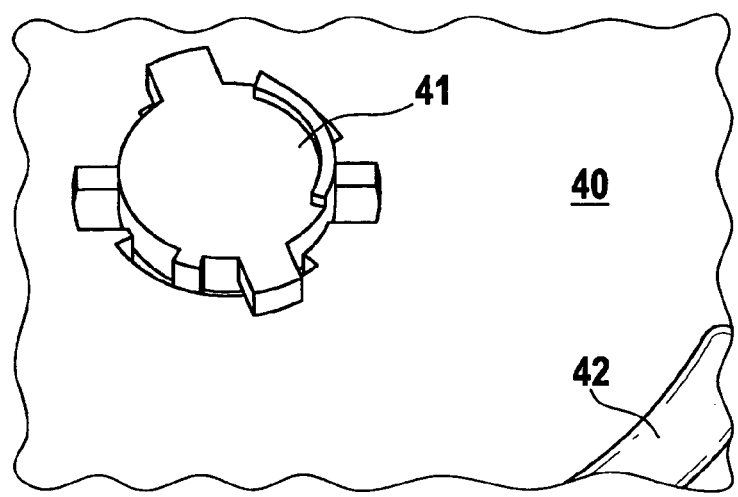
Figure 4E:
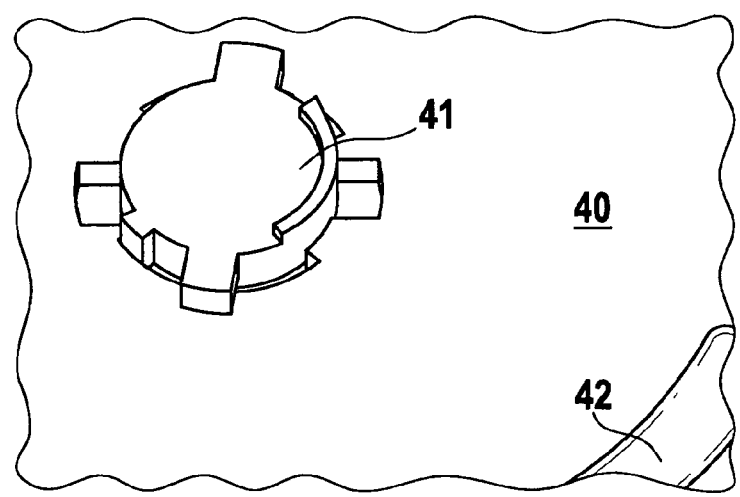
Figure 4F:
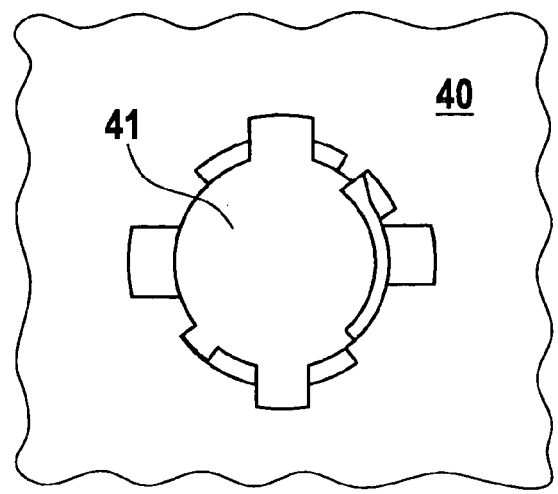

FIG. 4a shows how fastening arrangement 41 are lead through wall 40. Notch 42 may be seen in cutaway portions. In FIG. 4b, fastening arrangement 41, which can be, for example, a sensor, is rotated, namely in a clockwise manner. Figures c, d, and e show the rotation step by step, until the final position was reached in FIG. 4e. FIG. 4f also shows the accident sensor from the back side of the sheet metal, in the locked-in state, in a perpendicular view.

Figure 5:
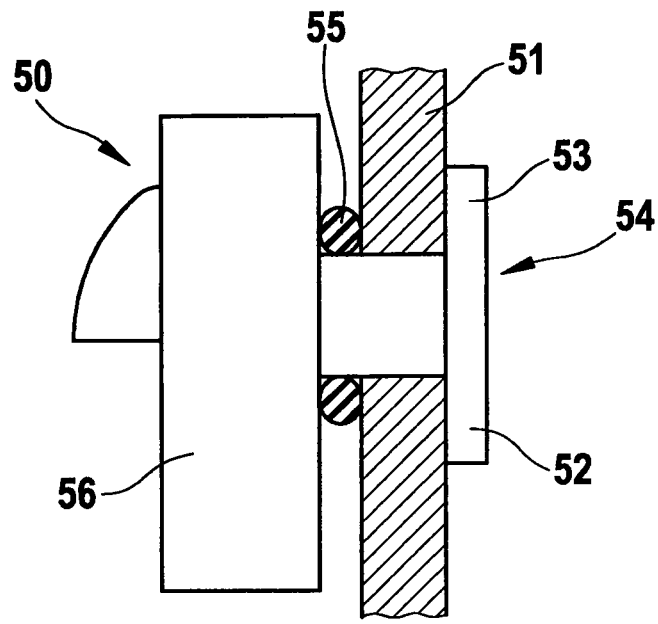
FIG. 5 shows a lateral view of the installed accident sensor.

FIG. 5 shows a first specific embodiment of the accident sensor according to the present invention in a lateral view. In this instance, the accident sensor is disposed in the wet area, with main body 50 and plug connector part 56. Sealing 55 seals the opening through wall 51 against the wet area. Fastening arrangement having supporting wings 52 and 53, in this instance labeled 54, hold the sensor on wall 51. But sealing arrangement 55, in this instance designed as a sealing ring, also absorb a part of the force, as described above.

Figure 6:
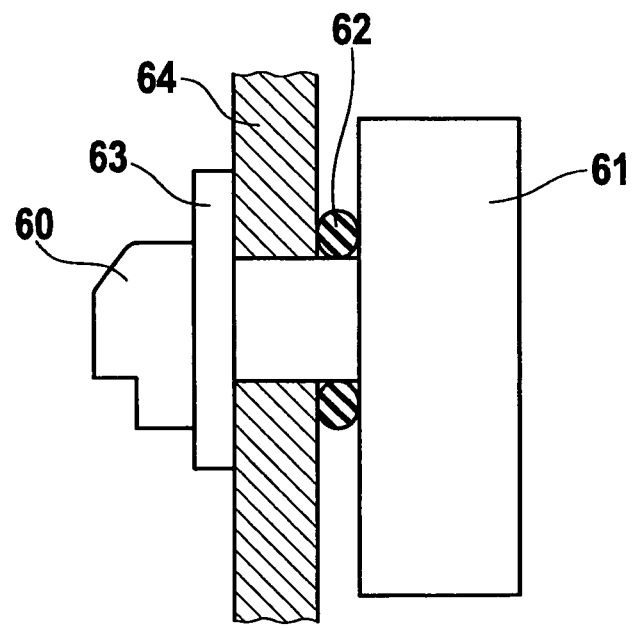
FIG. 6 shows an additional lateral view of the installed accident sensor.

FIG. 6 shows an alternative. Now fastening arrangement 63 are on the wet-area side, with pressure channel device 60 of the air-pressure sensor. Sealing 62 is now on the dry-area side and seals the opening in wall 64 against the dry area. Main body 61 of the air pressure sensor is located in the dry area. The connection to the cables then also takes place there.

If the connector part of the air-pressure sensor is located in the wet area, then the cables are also connected there, but through ducts that are provided in the wall in the door anyway, then led further into the dry area.

What is claimed is:
1. An accident sensor for a vehicle, comprising:
a fastening arrangement having a stop, at least one securing tab and at least two supporting wings, wherein the fastening arrangement is configured for fastening the accident sensor to a wall of the vehicle, wherein the fastening arrangement allows for an insertion into an opening in the wall and a rotation of the accident sensor up to a final position defined by the stop, wherein the at least one securing tab prevents a turning back of the accident sensor in the final position, and wherein in the final position, the accident sensor is fastened as intended such that additional accident sensor installation safeguards are omitted;

wherein the accident sensor is insertable in a single angular position in the fastening arrangement, wherein at least two supporting wings are formed differently so that one of the wings is substantially wider than the other of the wings, and wherein at least one of the supporting wings is configured so that the at least one supporting wing holds the accident sensor in a fastened state.

2. The accident sensor of claim 1, wherein the sealing arrangement seals the opening.

3. The accident sensor of claim 1, wherein with regard to a hardness or a form of the sealing arrangement, the sealing arrangement is a sealing ring and is configured to absorb a retention force together with at least one of the supporting wings.

4. The accident sensor of claim 3, wherein the fastening arrangement has at least one mechanical rib that allows for the accident sensor to be rotated in only one direction after the insertion, wherein the at least one securing tab locks into place in the final position and prevents a turning back.

5. The accident sensor of claim 3, wherein the accident sensor is configured so that the accident sensor is connectable to the electric cables only when the accident sensor is in the final position.

6. The accident sensor of claim 1, wherein the fastening arrangement has at least one mechanical rib that allows for the accident sensor to be rotated in only one direction after the insertion.

7. The accident sensor of claim 1, wherein the at least one tab locks into place in the final position and prevents a turning back.

8. The accident sensor of claim 1, wherein the accident sensor is configured so that the accident sensor is connectable to the electric cables only when the accident sensor is in the final position.

9. The accident sensor of claim 8, wherein the accident sensor has a marking that allows for a detection of the final position.

10. The accident sensor of claim 9, wherein the at least one securing tab allows for a fastening by at least one screw or at least one rivet.

11. The accident sensor of claim 1, wherein the accident sensor has a marking that allows for a detection of the final position.

12. The accident sensor of claim 1, wherein the at least one securing tab allows for a fastening by at least one screw or at least one rivet.

13. The accident sensor of claim 1, wherein the sealing arrangement is a sealing ring that seals the opening, wherein the sealing arrangement is a sealing ring and is configured to absorb a retention force together with at least one of the supporting wings.

14. The accident sensor of claim 1, wherein the fastening arrangement has at least one mechanical rib that allows for the accident sensor to be rotated in only one direction after the insertion, wherein the at least one tab locks into place in the final position and prevents a turning back, wherein the accident sensor is configured so that the accident sensor is connectable to the electric cables only when the accident sensor is in the final position, wherein the at least one securing tab for a fastening by at least one screw or at least one rivet, and wherein the accident sensor has a marking that allows for a detection of the final position.

15. The accident sensor of claim 1, wherein the accident sensor is only insertable into the opening of the wall in a single angular position, wherein the accident sensor is rotatable in only one direction after being inserted, wherein in the final position, the stop prevents an over-rotation, wherein the accident sensor locks into place audibly when it reaches the final position, wherein the accident sensor is configured so that it is not detachable without damage once it has reached the final position, wherein the accident sensor and the fastening arrangement are configured so that the accident sensor is contactable via cable or mating connectors only when it has reached its final position, and wherein the accident sensor has an additional securing tab that allows for an additional screw connection.

16. The accident sensor of claim 15, wherein the accident sensor includes a pressure sensor, wherein the fastening arrangement includes the pressure channel, wherein the wall is a partition wall and the fastening arrangement is located on a wet-area side of the wall, and wherein the main body and the plug connector are located on a dry-area side of the wall.

17. The accident sensor of claim 1, wherein the accident sensor includes a pressure sensor, wherein the fastening arrangement includes the pressure channel, wherein the wall is a partition wall and the fastening arrangement is located on a wet-area side of the wall, and wherein the main body and the plug connector are located on a dry-area side of the wall.

18. The accident sensor of claim 1, further comprising:
a plug connector and a main body in which a pressure sensor and electronics are located, wherein the main body having the pressure sensor includes a sealing arrangement and a fastening arrangement.

19. The accident sensor of claim 18, wherein the wall of the vehicle has a compressed notch to prevent electric cables from being connected to the plug connector as long as the pressure sensor has not reached the final position.

20. The accident sensor of claim 19, wherein an opening of the wall corresponds to the shape of the fastening arrangement and its supporting wings, so that the fastening arrangement is passable through the opening only in one specific angular position.

* * * * *